Figure 1:
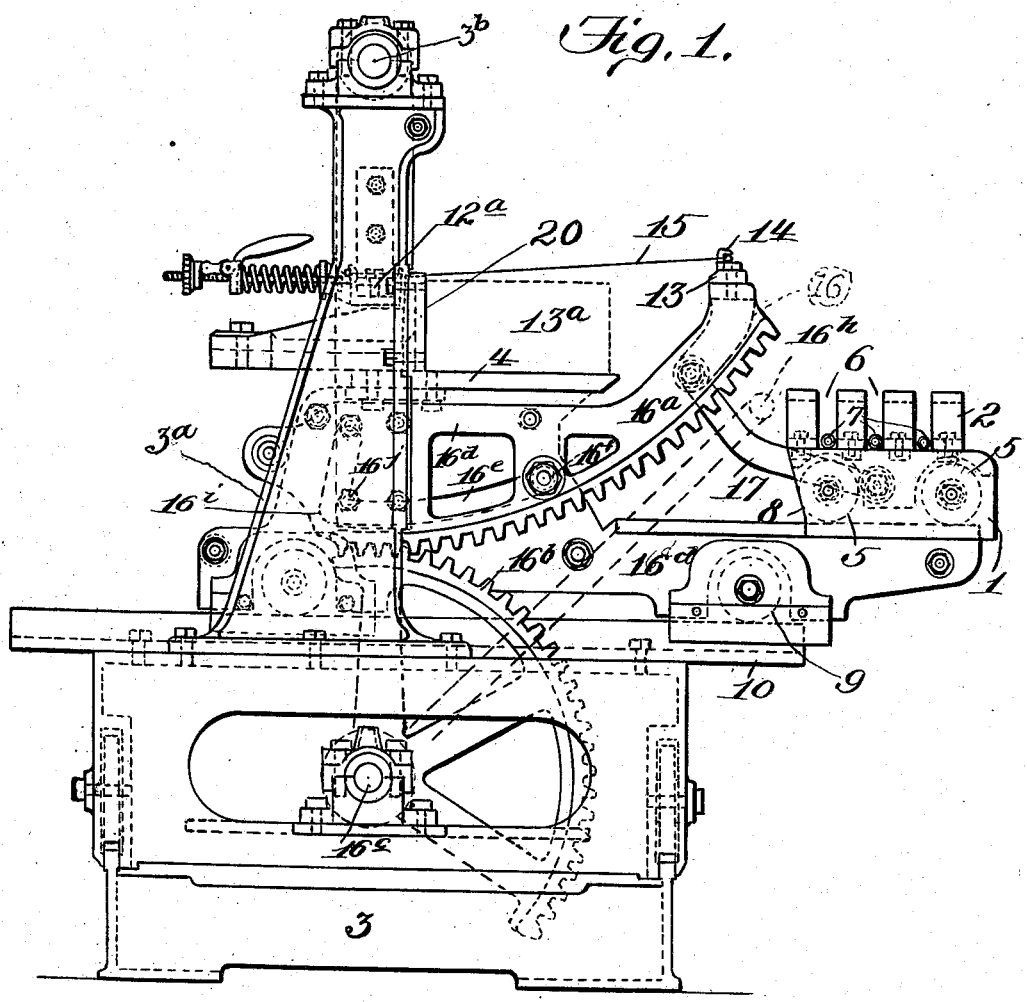

No. 867,149. PATENTED SEPT. 24, 1907.
A. RAMSAY.
BRICK CUTTING MACHINERY.
APPLICATION FILED MAR. 24, 1905.

2 SHEETS—SHEET 2.

Witnesses:
G. D. Hesler
Dennis Sunly

Inventor
Andrew Ramsay
By
James L. Norris.
Atty.

UNITED STATES PATENT OFFICE.

ANDREW RAMSAY, OF MOUNT SAVAGE, MARYLAND.

BRICK-CUTTING MACHINERY.

No. 867,149.   Specification of Letters Patent.   Patented Sept. 24, 1907.

Application filed March 24, 1905. Serial No. 251,853.

*To all whom it may concern:*

Be it known that I, ANDREW RAMSAY, a subject of the King of Great Britain, residing at Mount Savage, in the county of Allegany and State of Maryland, have invented new and useful Improvements in Brick-Cutting Machinery, of which the following is a specification.

This invention relates to brick-cutting machinery. In brick-cutting machinery an element thereof is known as "board delivery tables", which are adapted to receive the bricks and from there are transported to the drying department through the means of pallets. These pallets are generally constructed of wood or sheet iron, but it has been found difficult to keep the wood pallets from warping and to get the sheet-iron pallets true and level on surface. Consequently when the bricks are pushed from the cutting table onto the pallets, the bottom of the bricks coming in contact with the uneven pallets is damaged more or less. To overcome this difficulty is one of the objects of this invention, and to this end the delivery means, according to this invention, which receives the bricks from the cutting table comprises what may be termed a pallet-holder constructed straight and level on surface and upon which the bricks are deposited or delivered. The pallet holder is provided with one or more slots, into which one or more pallets is or are deposited, the slots being of such depth that when the pallets are mounted therein, they are below the surface of the holder, so that when the pallet or pallets is or are lifted up, it or they will carry the bricks therewith. The bricks are then transported to the drying department and another pallet, or pallets, dropped in the slots, and the operation repeated.

The invention further aims to construct the pallet-holder and pallets in such manner as to provide means whereby when the bricks are delivered upon the holder or the pallets, the entire bottom surface of the bricks is not in engagement throughout with the holder and pallets; consequently, enabling a certain amount of evaporation to be had and thereby obtaining quicker drying, which is desirable.

A further object of the invention resides in the construction and arrangement of the delivery table, whereby the said table will be independent of the cutting table, and so that the said table when set up and operated will not be in the way of the wire-holder, which has been found to be objectionable. To this end the delivery table is not attached to the cutting table but travels upon a suitable support, and the said delivery table is adapted to be moved towards and away from the cutting table in a manner as hereinafter referred to.

A further object of the invention consists in the construction, arrangement and operation of the cutting wires and their support, such wires being so positioned and operated that during the cutting of the clay, they will move downwardly substantially in the arc of a circle, thereby cutting through the clay at an inclination which not only facilitates the cutting operation but also makes a clean cut.

With the foregoing and other objects in view, the invention consists of the novel combination, construction and arrangement of parts hereinafter more specifically described, illustrated in the accompanying drawings, which form a part of this specification, and particularly pointed out in the claims hereunto appended.

Figure 2:
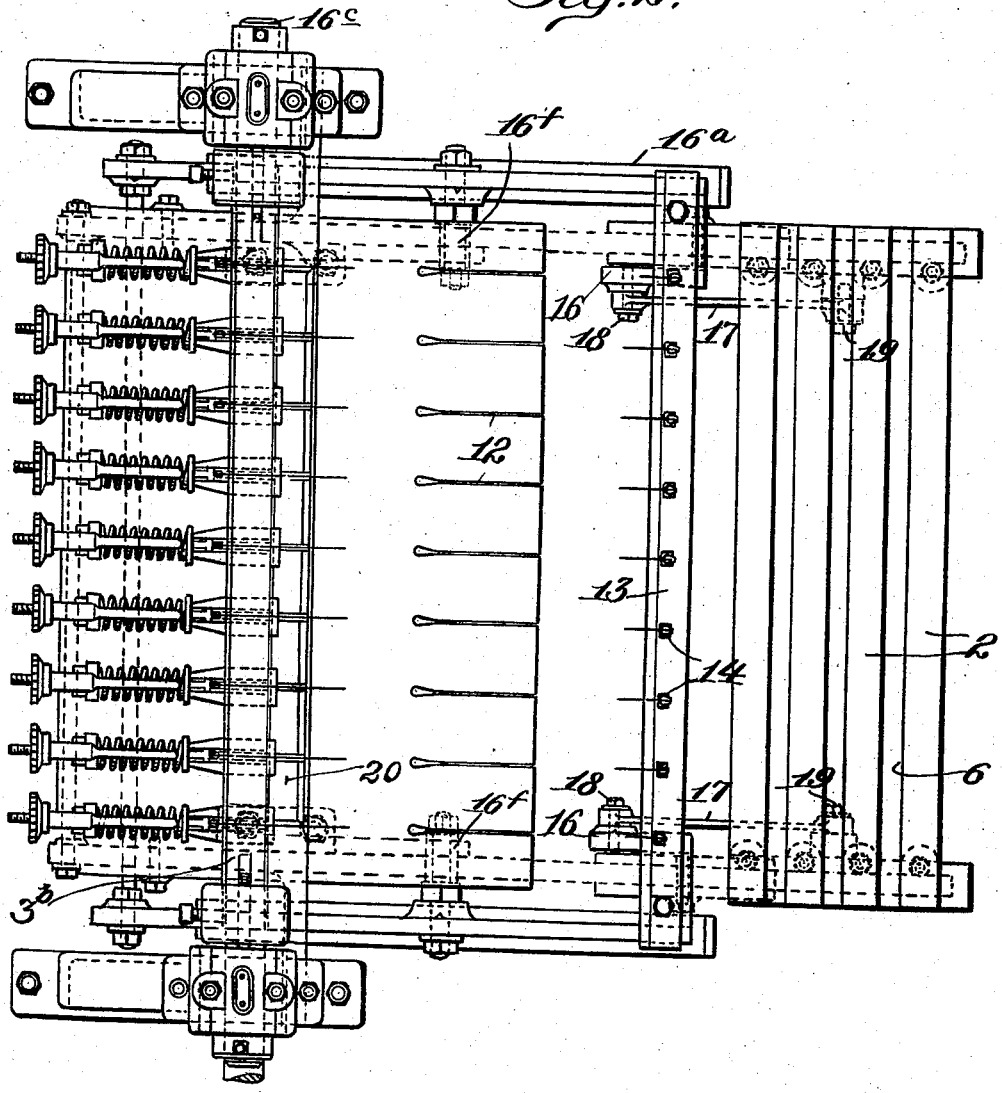

In describing the invention in detail, reference is had to the accompanying drawings, wherein like reference characters denote corresponding parts throughout the several views, and in which:

Figure 1 is a side elevation, showing portions of a brick-cutting machine in accordance with this invention, and Fig. 2 is a plan view thereof.

Referring to the drawings by reference characters, the delivery table is formed of a reciprocatory support and removable pallets. The support is termed a "pallet-holder" and consists of a lower section 1 and an upper section 2. The lower section 1 travels upon the supports $16^d$ of the cutting table 4. Said base is provided at each side with an elongation so that the said section 1 can travel thereon. The section 1 carries the rollers 5 which rest and travel upon the support $16^d$. The upper section 2 is formed of a series of vertical members connected together by transversely-extending members. The vertical members are spaced apart so as to form the slots 6 into which are placed the pallets 7. The bars and uprights which form the section 2 are cast so that the upper surface thereof will be straight and even, and the uprights 2 are fixed to the section 1 in any suitable manner. The pallets 7, as shown, are cylindrical in cross-section, but can be of any suitable contour, and the said pallets 7 extend outwardly from each side of the section 1 so that they can be readily grasped and removed from the pallet-holder carrying the bricks therewith. The height of the pallet-holder is such that the upper surface of the transverse bars which form a part of the section 2 will be in alinement with the upper surface of the cutting table 4. That end of the section 1 which is arranged adjacent to the edge of the cutting table is cut away, as at 8, so as to form a clearance for the wire-holder, to be hereinafter referred to. The supports $16^d$ of the cutting table carry a plurality of rollers 9 which travel upon the track 10 so that the said cutting table can reciprocate and have the said reciprocations thereof associate with the reciprocations of the pallet-holder in a manner as hereinafter referred to. The reciprocation in one direction of the cutting table is to shove the cut bricks therefrom and upon the pallet-holder. The cutting table 4 is provided with a series of slits 12 to permit of the passage of the cutting wires, to be hereinafter referred to. The track 10 is secured to the base 3 of the machine and at each side of the base 3 an upright 3ᵃ is arranged, said uprights being connected together at their tops by the shaft 3ᵇ.

The reference character 12ᵃ denotes the rearward cutting wire-holder secured between a pair of toothed quadrants 16ᵃ and to which the rear ends of the cutting wires 15 are attached. The forward cutting wire holder is indicated by the reference character 13 and which is provided with a series of clamps 14 to which forward ends of the cutting wires 15 are connected, there being as many cutting wires 15 as there are slits 12 in the cutting table. The wire-holder 13 is adapted to have an oscillatory movement imparted thereto so that it will cause the cutting wires to move substantially in the arc of a circle, thereby cutting through the clay 13ᵃ at an inclination which not only facilitates the cutting operation, but also makes a clean cut. The other end of the cutting wires is suitably connected to a support, not shown, the connection being such that the necessary movement of the cutting wires during the cutting operation will not be retarded in any manner. The normal position of the cutting wires, that is to say, before the cutting operation is such that they extend over the top of the clay and in parrallelism therewith, so that when the wire-holder is oscillated, the cutting wires will travel substantially in the arc of a circle and cut in an inclined manner through the clay.

The wire-holder 13 is supported upon two double-crank arms 16, one arm of each of such double-crank arms 16 arranged exteriorly of the support 16ᵈ and the other arm of which is arranged interiorly of the support 16ᵈ, and the said double-crank arms are connected to the toothed quadrants 16ᵃ supported upon the shaft 3ᵇ. The quadrants 16ᵃ mesh with a pair of toothed quadrants 16ᵃ mounted upon the shaft 16ᶜ journaled in the base 3 of the machine. The supports 16ᵈ of the table are each formed with a substantially L-shaped slot 16ᵉ, one branch of said slot being longer than the other, the elongated portion extending in the arc of a circle and the other portion extending vertically at an inclination. Projecting into each of the slots 16ᵉ is a roller 16ᶠ. There is a roller 16ᶠ connected to each of the supports 16ᵈ and fixed to each of the quadrants 16ᵃ. An operating lever 16ʰ is connected to the shaft 16ᶜ for actuating it so that when the lever 16ʰ is pulled towards the rear of the machine the shaft 16ᶜ is rocked in one direction so that the quadrants 16ᵇ are carried rearwardly with the shaft 16ᶜ, and, owing to the meshing of the quadrants 16ᵇ with the quadrants 16ᵃ, these latter will have a downward movement imparted thereto. During the operation of the quadrants 16ᵃ the rollers 16ᶠ move through the elongated portions of the slots 16ᵉ until the rollers reach the point 16ⁱ, when, on a further movement of the quadrants 16ᵃ, and owing to the engagement of the rollers 16ᶠ with the wall of the vertical portion of the slots 16ᵉ, the table is caused to move rearwardly until the forward end of said table is in alinement with the forward face of the abutment 20. Owing to the rearward movement of the table 4 and in connection with the abutment 20, the bricks, when the forward end of the table 4 is in alinement with the forward face of the abutment 20, are then transferred to the section 2. On reversing the movement of the quadrants 16ᵃ the rollers 16ᶠ engage the wall of the vertical portion of the slots 16ᵉ and move the table back until the said rollers pass the point indicated by the reference character 16ʲ, when by this time the table will have returned to its original position. Further upward movement of the quadrants 16ᵃ is allowed by the passage of the rollers 16ᶠ forwardly in the elongated portions of the slots 16ᵉ. Owing to the manner of constructing the slots 16ᵉ the elongated portions are in the arc of a circle and consequently the table 4 will be stationary until the rollers 16ᶠ reach the point 16ⁱ or pass the point 16ʲ, as hereinbefore referred to. Therefore, the table cannot move back until the rollers 16ᶠ are at the point 16ⁱ owing to the fact that the rollers 16ᶠ travel in the same arc as the elongated portion of the slots 16ᵉ. By such construction the table 4 is retained stationary while the bricks are being cut; otherwise if the table 4 moved the bricks would be partially delivered before they were cut. When the operator grasps the handle 16ʰ and throws the same back motion is transmitted through the shaft 16ᶜ to the quadrant 16ᵃ, 16ᵇ, so that the wire holder 13, which is connected to the quadrants 16ᵃ will move downwardly. The wire holder 12ᵃ will also move in the same direction. When the quadrants 16ᵃ are moved in an opposite direction the wire holders will be returned to normal position. At the commencement of the cutting operations the wires 15 will extend at the angles shown in the drawing owing to the fact that the wire holder 13, when in normal position, is arranged above the wire holder 12ᵃ, the latter being on a level with the face of the brick. As the quadrants 16ᵃ move downwardly and inwardly the wire holders move therewith and carry the cutting wires so as to cause them to first pass through the brick parallel with the face thereof, after which the cutting wires move downwardly and backwardly, thus securing an easy and clean cut.

The inner arm of each of the double crank arms 16 is connected through the medium of the pivoted link 17 to the section 1 of the pallet-holder, said link being curved and connected, respectively, to the crank arm and support, as at 18, 19. Such connection between the arms 16 and the section 1, imparts a reciprocating movement to the said section 1 when the wire-holder is operated. The connection is such that when the wire-holder 13 reaches a position below the table 4, the section 1 will be drawn towards said table 4, and as soon as the said section 1 is in close proximity to the table 4, the base 3 of the said table is moved with the said section 1 and the bricks are shoved upon the pallet-holder. A suitable abutment is provided to cause the shoving of the bricks off the table 4, as it moves with the pallet-holder, upon the pallet-holder. When the wire-holder 13 is moved in an opposite direction, the table 4, through the medium of the mechanism which reciprocates it is caused to assume its normal position, and the connection between the crank-arms 16 and the section 1 of the pallet-holder, causes the said pallet-holder to be moved in an opposite direction. When the pallet-holder has arrived at the end of its movement, the pallets are lifted out of said holder, carrying the bricks therewith, and the bricks are then transported to the drying department. The cut-away portion of the section 1, as before stated, forms a clearance space, said clearance space adapted to permit of the downward movement of the wire-holder 13.

Having thus fully described my invention, what I claim as new and desire to secure by Letters Patent, is:

1. In brick-cutting machinery, the combination with a cutting table and a reciprocatory brick-delivery means arranged in operative relation with respect to said table, of a cutting means interposed between the table and the delivery means and adapted to move downwardly during the cutting operation, and an operative connection between the delivery means and the cutting means for moving the delivery means towards the cutting table when the cutting means is moved below the level of the cutting table.

2. In brick-cutting machinery, a cutting table, a reciprocatory support arranged in operative relation with respect to said table and having that end opposed to the end of the cutting table formed at an inclination, a cutting means interposed between the cutting table and the said support, a pallet-holder carried by said support, and a pallet mounted in said holder and arranged below the upper surface thereof.

3. In brick-cutting machinery, a cutting table, a reciprocatory support arranged in operative relation with respect to said table and having that end opposed to the cutting table formed at an inclination, a cutting means interposed between the cutting table and the said support, a pallet-holder carried by said support, a pallet mounted in said holder and arranged below the upper surface thereof, operating means for said cutting means, and an operative connection between said cutting means and said support for moving the support during a part of the operation of said cutting means.

4. Brick-cutting machinery having an oscillatory wire-holder, cutting wires connected thereto and moving therewith, a reciprocatory pallet-holder, and an operative connection between the wire-holder and pallet-holder for reciprocating the latter when the former is operated.

5. Brick-cutting machinery having an oscillatory cutting means, a cutting table, a delivery table, and an operative connection between said means and delivery table for moving the latter towards the cutting table when said means is moved to a point below the cutting table.

6. In brick-cutting machinery, an oscillatory cutting means, a delivery table, and an operative connection between said cutting means and table for moving the latter during a part of the operation of said means.

7. In brick-cutting machinery, an oscillatory cutting means, a slotted pallet-holder, pallets mounted in said slots, and an operative connection between said cutting means and holder for moving the latter during a part of the operation of said means.

8. In brick-cutting machinery, a reciprocatory cutting-table, a reciprocatory slotted pallet-holder, removable pallets mounted in the slots of said holder, an oscillatory cutting means, and an operative connection between the pallet-holder and cutting means.

9. In brick-cutting machinery, the combination with a cutting means, of a delivery table and a cutting table arranged in operative relation with respect to each other and having a clearance space to permit of the operation of the cutting means between said tables.

10. In brick-cutting machinery, a reciprocatory cutting table, a reciprocatory delivery table, and cutting means adapted to pass through the face of the brick parallel with the face and through the arc of a circle with a downward and rearward movement.

11. In brick-cutting machinery, an oscillatory wire holder, a plurality of cutting wires connected to said holder and adapted when said holder is shifted in one direction to move through the face of the brick parallel with the face and through the arc of a circle with a downward and rearward movement.

12. In brick-cutting machinery, the combination with a movable lower wire-holder, an upper wire-holder, and cutting wires connected at each end to said holders, of a reciprocatory cutting table, and a reciprocatory delivery table, said tables arranged in operative relation with respect to each other and having a clearance space therebetween to permit of the operation of said lower wire-holder.

13. In brick-cutting machinery, the combination with a movable lower wire-holder, an upper wire-holder, and cutting wires connected at each end to said holders, of a reciprocatory cutting table, a reciprocatory delivery table, said tables arranged in operative relation with respect to each other and having a clearance space therebetween to permit of the operation of said lower wire-holder, and means for operating said wire-holder and for simultaneously transmitting motion to said delivery table.

14. In brick-cutting machinery, the combination with a movable lower wire-holder, an upper wire-holder, and cutting wires connected at each end to said holders, of a reciprocatory cutting table, a reciprocatory delivery table, said table arranged in operative relation with respect to each other and having a clearance space therebetween to permit of the operation of said lower wire-holder, and an operative connection between said wire-holder and tables for suitably operating them.

In testimony whereof I have hereunto set my hand in presence of two subscribing witnesses.

ANDREW RAMSAY.

Witnesses:
  H. L. BOGAN,
  GEO. W. REA.